United States Patent

[11] 3,566,080

| [72] | Inventors | Malcolm R. Uffelman;<br>Warren L. Holford, Fairfax, Va. |
|---|---|---|
| [21] | Appl. No. | 634,333 |
| [22] | Filed | Apr. 27, 1967 |
| [45] | Patented | Feb. 23, 1971 |
| [73] | Assignee | Scope Incorporated<br>Falls Church, Va. |

[54] TIME DOMAIN PRENORMALIZER
6 Claims, 3 Drawing Figs.

[52] U.S. Cl. ...................................................... 235/61.6,
235/61.11, 250/219, 250/233
[51] Int. Cl. ...................................................... G06k 9/12,
G01n 21/30, G01d 5/36
[50] Field of Search ............................................ 235/61.115;
250/203, 219 (ICR), 233; 235/61.6 (A);
340/146.3 (Cursory); 250/219 (IDC), 219 (DOC)

[56] References Cited
UNITED STATES PATENTS

| 2,856,128 | 10/1958 | Ferre | 235/61.6A |
| 2,859,915 | 11/1958 | Doll | 235/61.6(A) |
| 2,933,246 | 4/1960 | Rabinow | 250/219ICRX |
| 2,937,283 | 5/1960 | Oliver | 250/219ICR |
| 2,980,332 | 4/1961 | Brouillette | 235/61.6(A) |
| 2,997,539 | 8/1961 | Blackstone | 250/233X |
| 3,059,521 | 10/1962 | Clemens | 250/233X |
| 3,061,730 | 10/1962 | Jankowitz | 250/203 |
| 3,199,111 | 8/1965 | Jennings | 235/61.6(A) |
| 3,239,674 | 3/1966 | Aroyan | 250/203 |
| 3,339,076 | 8/1967 | Hilal | 250/219DOC |

*Primary Examiner*—Daryl W. Cook
*Assistant Examiner*—Robert M. Kilgore
*Attorney*—Schulze, Blair & Benoit ABSTRACT: An image-analyzing system using a rotating sweeping line scan to provide an input to a set of normalizing time domain filters which produce a set of outputs which describe the image in a manner independent of translation or rotation of the image. The set of outputs can be used by a pattern recognition device to classify the image.

TIME DOMAIN PRENORMALIZER

This invention relates generally to image analyzing and processing, and more specifically to processing images using a time domain analysis.

In many fields of image processing, it is highly desirable to obtain measurements about the objects depicted by imagery, such as a two-dimensional density distribution, in a system such that the values of the measurements are substantially independent of object orientation. In such a system, the measurements are substantially dependent on the shape of the objects. One illustration of such a system is in the use of aerial photography for detection and identification of objects on the ground. For instance, if the object is an airfield, and identification is independent of the specific location of the field in the photograph, only the shape of the field is important. The method of making such measurements which are independent of unessential variations is called prenormalization.

Such a prenormalization of measurements of two-dimensional images is shown in copending U.S. application Ser. No. 311,489 filed Sept. 25, 1963 now U.S. Pat. No. 3,508,065 and assigned to the assignee of the present invention. This application is based on the use of a unique method of scanning images using a moving, rotating line rather than the normal moving point or spot. The video output of the scanner provides the input to a system which processes this output using dual level frequency domain filters.

The present invention contemplates the use of the prenormalization of the above-identified application obtained by the use of the flying line or integral scan together with a novel time domain analysis of the video output generated by the scanner.

As set forth in the above application, the integral scanner contains waveforms which are related in shape to the objects under view. If such an object is moved relative to the viewing field, the constituent waveforms vary in time or phase order of arrival but not in the shape of the object. More specifically, a rotation of the object causes a shift in phase arrival but not in the interconstituent timing, while a translation of the object causes changes in the interconstituent timing, but not in the phase. A combination of translation and rotation causes both to vary. Accordingly, to process the video output in such a way that the resulting values are not affected by translation or rotation, it is necessary to analyze the constituent waveforms so that only their shapes, and not their time of arrival are considered. This invention performs such analysis.

The invention will be more clearly understood from the following illustrative description when taken in conjunction with the drawings, wherein.

Figure 1:
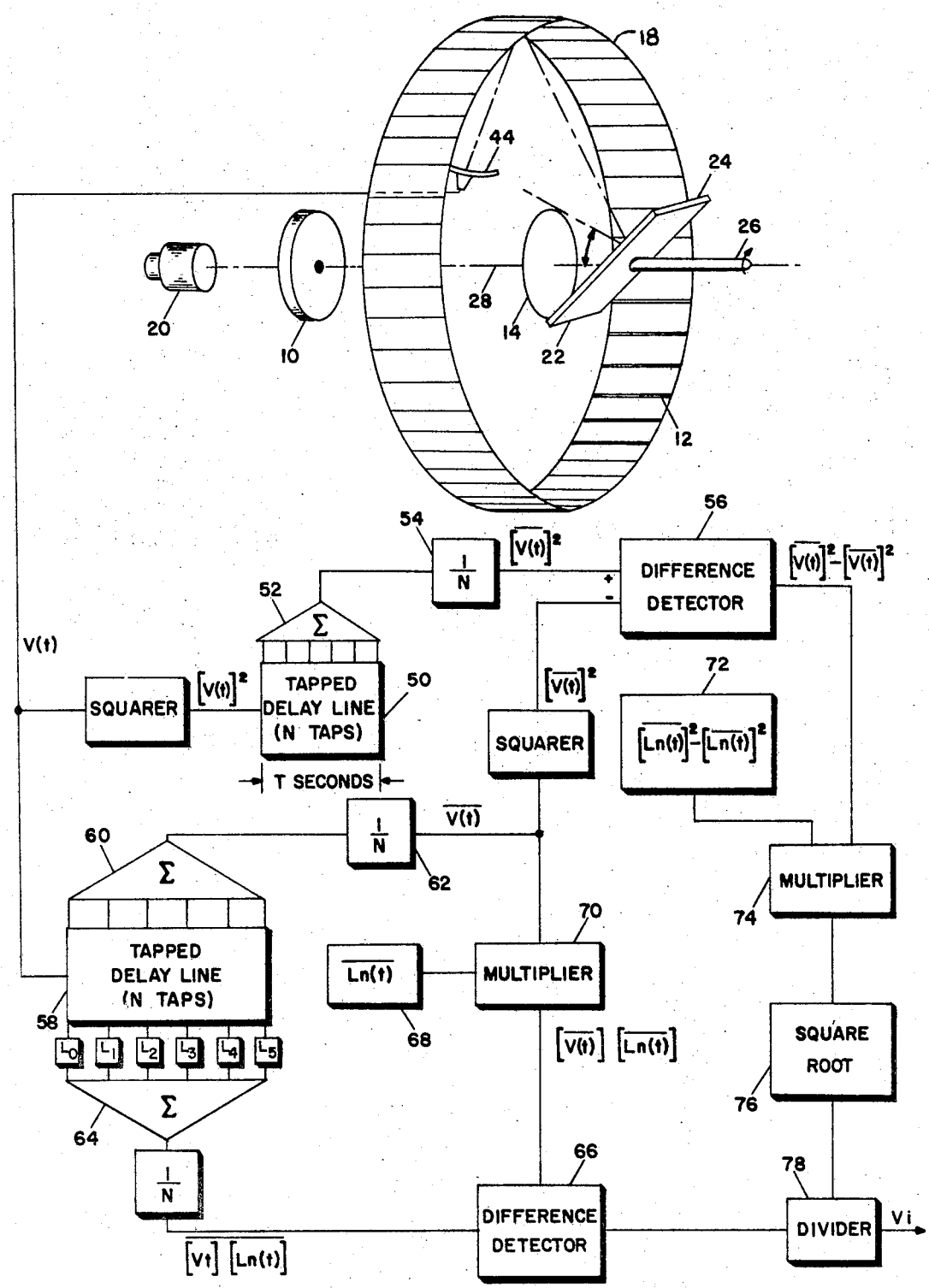
FIG. 1 is a schematic representation of one type of integral scanner and the associated time domain analysis circuitry.

Turning now more specifically to FIG. 1, there is shown one type of integral scanner as described in the above-identified application. This system utilizes a line integral scanning process wherein a plurality of scanning lines are successively swept across an image to be analyzed, and photoelectric means, such as a photomultiplier tube, is illuminated by the portion of the image covered by the scanning lines to produce a signal which is a function of the integral of the light values of the portion of the image within the area covered by the scanning lines as it sweeps across the image.

One practical implementation of a scanning system of the type described above is illustrated in FIG. 1 and is substantially the same as one embodiment disclosed in the above-identified application. As shown, the image from the image field 10, which is provided in the form of a transparency, will be projected by means of a light source 20 through converging lens 14 upon a rotating mirror assembly 22. The rotating mirror assembly 22 comprises a plane mirror 24 which intersects the optical axis of image field 10 and is inclined at an angle of 45° thereto. The mirror is mounted upon a rotating shaft 26 which lies on the optical axis 28. As mirror 24 rotates, it defines a substantially conical reflecting surface so that the image field 10 is reflected from the rotating mirror 24 upon the inner surface 12 of sampling cylinder 18. Cylinder 18 has a plurality of mirrors 12 separated by nonreflecting spacers. Since the rotating mirror 24 effectively presents a conical reflecting surface, the image reflected therefrom will change positions as it traverses the inner surface of sampling cylinder 18. The image will complete one revolution as it traverses the circumference of the cylinder 18, and the image is thus translated and rotated simultaneously as the mirror 24 rotates.

A photoreceptor 44, such as a photomultiplier tube, is suitably located with respect to the inner surface mirrors 12 so that the reflection of the image translating therealong will be received by it to generate a video signal $V(t)$ corresponding to the contour integral data of the image. The photoreceptor 44 may be mounted for rotation with the cylinder or a plurality of stationary receptors may be used. Accordingly, the image is made to traverse an alternately reflecting and nonreflecting grid as it passes over the inner surface of cylinder 18. Since the image will assume various angles with respect to the reflective segments 12 as it translates along the surface, at any single instant the resultant signal is dependent upon the slope of the image and how it is oriented with respect to the reflecting surfaces.

Since the orientation with respect to the image of each successive reflector 12 which sweeps by is different, the image derived by each grid is uncorrelated with the others. The video waveform generated by this sampling method becomes a series of pulses, each pulse being a continuous series of line integrals effected by the surfaces 12 as they sweep across the image. For specific details and analysis of such a system, reference is hereby made to the above-identified application.

The present invention utilizes the generated signal $V(t)$ as the input to a processing system which is termed a normalizing time domain filter and will hereinafter be referred to as NTDF. Broadly, this NTDF computes the normalized and scaled average value of the video signal $V(t)$ and a reference function $Ln(t)$ over a finite and defined time period of duration $T$. This can be expressed as follows:

$$\phi_n = \frac{\overline{V(t)Ln(t)} - \overline{(V(t))}\ \overline{(Ln(t))}}{\sqrt{[(\overline{[V(t)]^2}) - ([\overline{V(t)}]^2)]\,[(\overline{[Ln(t)]^2}) - ([\overline{Ln(t)}]^2)]}}$$

Where:
$\Phi_n$ = the instantaneous output of a NTDF
$V(t)$ $(t)$ the video output of the integral scanner
$t = \dfrac{\theta}{\omega}$ = the instantaneous time within the fixed period $T$ which progresses relative to the ratio of total mirror rotation with respect to frequency of rotation $Ln(t)$ = a reference function developed as explained below.

$\overline{Ln(t)}$, $[Ln(t)]^2$ and $[\overline{Ln(t)}]^2$ are all fixed constants developed from the reference function.

It should be noted that the bar denotes the time average of the function over the last $T$ seconds, $T$ being a predetermined fixed period of time selected by the particular desired design.

If the output $V(t)$ is an integral function, then the reference function $Ln(t)$ should be a like function. If we assume a rotation of the mirror of 360° the time period $T$ will be chosen as a period within the total time it takes to make the complete 360° rotation. However, for each instant $(t)$ the waveform presented within the time period will vary in accordance with the changing video signal $V(t)$.

The reference function $Ln(t)$ ideally would be developed by taking the integral of all of the individual functions over the time period $T$. However, this is substantially equal to the summation of a plurality of individual functions if such a great enough number of such functions are used. In this manner, the reference function $Ln(t)$ is provided with $n$ being the particular individual function involved for that instant of time.

One system for the NTDF is illustrated in the circuit $[Ln(t)]$. schematic of FIG. 1 which is based on the use of a means for producing a delayed representation of the video output of the integral scanner such as matched tapped delay lines.

The video signal $V(t)$ is squared and provided as an input to tapped delay line 50 which operates over a period of $T$ seconds. If the band of frequencies occupied by $V(t)$ is 0 cycles per second to $\omega o$ cycles per second, then the tapped delay line should have $2T\omega o$ taps to adequately represent the video and the reference function.

The output of delay line 50 is summed by means such as divider 54. The output $\overline{Vt^2}$ of the divider is supplied to difference detector 56.

The video signal $V(t)$ is also provided as a direct input to a second tapped delay line 58 similar to delay line 50. The output of delay line 58 is summed in amplifier 60 and passes through divider 62 to provide output $\overline{Vt}$. This output is squared and supplied as the second input to difference detector 56. Thus, the output of detector 56 provides the difference between the average of the squared inputs and the square of the average inputs which is the first term of the divisor of the above equation.

The output of detector 56 is supplied to multiplier 74 together with the output of reference function selector 72 which develops a function representative of the difference between the average of the squares of the individual reference functions and the square of the average of the reference functions. Thus, the output of multiplier 74 provides the two functions of the divisor. The final desired function is provided by the square root means 76.

The output of delay line 58 is also supplied through a series of fixed function means such as $L_0$—$L_5$ to a summing amplifier 64. The values of the function means are chosen in accordance with a predetermined evaluation for the range of the video input and are scaled so as to form the reference function $Ln(t)$, where $n =$ the particular instantaneous function, multiplied by the video input $V(t)$. This output is divided by the number of taps to provide the function $\overline{[V(t)]\,[Ln(t)]}$ to a difference detector 66.

The output $\overline{V(t)}$ of divider 62 is also supplied to multiplier 70 together with the reference function $\overline{Ln(t)}$ where they are multiplied to provide the function $[\overline{Vt}]\,[\overline{Ln(t)}]$ as a second input to detector 66. The output of the detector 66 provides the difference between the average of the product of the video output and reference function, and the product of the individual averages of the video input and the reference function. Such an output will be recognized as the numerator in the above equation.

The numerator and divisor outputs are supplied to divider 78 to provide the desired instantaneous output from the NTDF.

Figure 2:
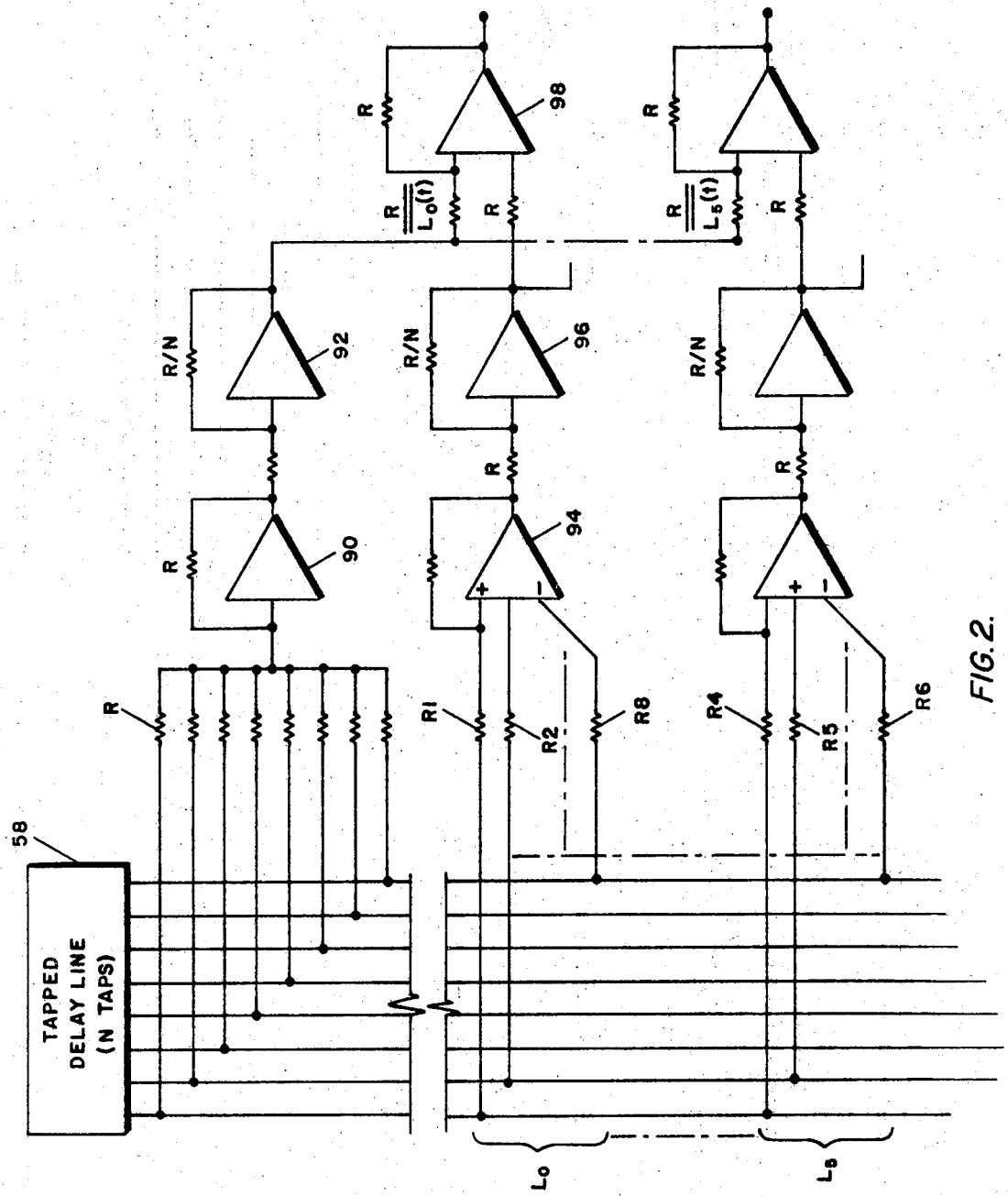
FIG. 2 is a schematic illustration of one means of obtaining the reference function.

FIG. 2 discloses a schematic illustration of the development of the reference function from tapped delay line 58. The first function illustrated as developed below the delay line is $\overline{[Vt]}\,L(t)a[$. A plurality of identical resistors R are connected to each of the taps with the output of the resistors being provided to feedback amplifier 90. The output of amplifier 90 is then passed through amplifier 92 having a feedback resistor of the value R/N so as to provide the average of the video $\overline{Vt}$.

The term $L(n)$ is indicative of the particular instantaneous function involved over the scan time $T$. These functions are shown as $L_0$ through $L_5$ in FIG. 1 with only two illustrated in FIG. 2 for purposes of clarity.

Using one specific example $L_0$, a plurality of resistors $R_1$ through $R_8$ are connected to respective taps of the delay line. Each of these resistors has a predetermined selected value and is connected to the positive or negative input of amplifier 94 so as to provide the desired individual output. The output of amplifier 94 is passed through amplifier 96 to provide the instantaneous average value $\overline{V(t)\,L_0(t)}$. The difference between these two functions is obtained by means of amplifier 98 having one input from amplifier 92 passing through a resistor of value $R/\overline{L_0(t)}$ and the other input passing through resistor R. This same system applies to each of $L_0$ through $L_5$ during the period of operation in which they are involved.

It will be apparent that the other values of $Ln(t)$ in the above equation can be developed in like manner.

Figure 3:
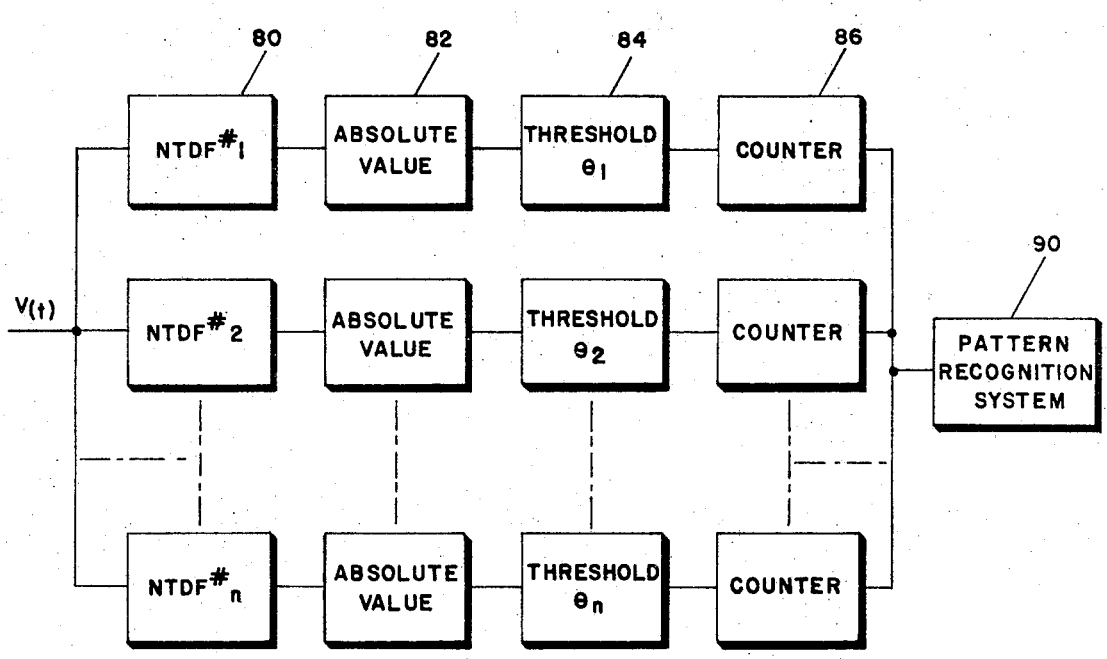
FIG. 3 is a block diagram of a basic prenormalizer using a plurality of the devices illustrated in FIG. 1 to form a basic prenormalizer.

FIG. 3 discloses a block diagram of a basic prenormalizer which is composed of a plurality of NTDF's.

The output of a NTDF is a numerical measure of how closely the last $T$ seconds of the video $V(t)$ matched the reference function $Ln(t)$ independent of scale or DC offset. If the last $T$ seconds of video had exactly the same shape as the reference function, i.e. was of the form $kLn(t) + C$, where $k$ is a scale factor and $C$ is a DC term, the output of the NTDF would be unity. If the video is a mirror image, $-kLn(t) + X$, the output would be minus one. If the video is totally unlike the reference function, the output would be zero.

Since mirror images should be ignored in processing imagery, the output from the NTDF 80 is passed through an absolute value circuit 82. Therefore, a light object on a dark background is considered the same as the identical object seen as a dark object on a light background.

The reference functions of the various NTDF's are generally selected such that $$\frac{1}{T}\int_0^T Ln(t)Lm(t)dt$$

In this case, the function is 0 when $n \neq m$ and 1 when $n=m$.

This means that the $Ln(t)$'s are generally orthonormal to each other. However, there are other ways of specifying the reference functions.

One channel of FIG. 3 will be discussed as an illustrative example. Assume one complete video presentation from an integral scan of a picture. Every time the absolute value of the normalized time average of the product between $Ln(t)$ and $V(t)$ over the previous $T$ seconds exceeds a predetermined threshold in device 84 counter 86 will record the event. At the completion of one scan operation, the counter will contain the number of times the threshold was exceeded. If the picture is assumed to be of an airplane in a field, and the airplane is rotated with respect to the viewing field after one scan, a rescan will generate a video which contains exactly the same constituent waveshapes with only a change in the phase of arrival. However, the threshold will be exceeded exactly the same number of times so that the ultimate count in the counter will be the same. If the airplane is translated in the viewing field, the result will be the same. Therefore, the measurement is invariant to translation and rotation.

The value of the total count is a function of the shape of the object or objects generating the video signal. In general, the more $Ln(t)$'s used, the better is the representation of the object depicted by the imagery.

After a complete scan, the values in the counters can be used as the patterns for a pattern recognition device which can classify the object in the viewing field from present information. One such pattern recognition device is disclosed in U.S. Pat. No. 3,295,103 issued Dec. 27, 1966.

It is to be understood that the above description is illustrative only and the invention is to be limited only the the scope of the following claims.

We claim:

1. An image analyzer comprising:
   means for scanning an image to be analyzed by relatively sweeping a scanning line thereacross;
   means responsive to the integral of the light value of the portion of said image within said scanning line for producing an electrical wave having a waveform which is a function of the integrals of the light values of said image as said scanning line sweeps thereacross;

means producing a delayed representation of said electrical wave for analyzing said electrical waveform over a predetermined time period;
an electrical circuit for producing a reference function; and
electrical circuit means for computing the normalized and scaled average value of the product of said delayed representation of said electrical wave and said reference function.

2. The image analyzer of claim 1 wherein said means producing a representation of said electrical wave comprises a tapped delay line.

3. The image analyzer of claim 1 further comprising;
means for obtaining the absolute value of said computed product;
means for comparing said absolute value to a predetermined threshold value; and
means for counting the number of times said absolute value exceeds said threshold value over said predetermined time period.

4. The image analyzer of claim 3 further comprising a pattern recognition device coupled to the output of said counter.

5. An image analyzer comprising:
means for scanning an image to be analyzed by rotatively sweeping a scanning line thereacross;
means responsive to the integral of the light value of the portion of said image within said scanning line for producing an electrical wave having a waveform which is a function of the integrals of the light values of said image as said line sweeps thereacross;
a normalizing time domain filter means for analyzing said electrical wave and having an instantaneous output $\Phi n$ of $$\frac{\overline{[V(t)][Ln(t)]} - \overline{(V(t))}\ \overline{(Ln(t))}}{\sqrt{(\overline{[V(t^2)]} - \overline{[V(t)]^2})\ (\overline{[Ln(t)^2]} - \overline{[Ln(t)]^2})}}$$

over a fixed period of time $T$ of the said electrical wave $V(t)$, where the bar denotes the time average over said time period $T$, and where $t = \frac{\theta}{\omega} =$ the instantaneous time within the fixed period $T$, and which progresses relative to the ratio of said rotative sweep $\theta$ with respect to the frequency $\omega$ of said rotation;

$Ln(t) =$ a fixed reference function;

$\overline{Ln(t)}$, $[\overline{Ln(t)}]^2$ and $[\overline{Ln(t)^2}]$ are fixed constants relative to $Ln(t)$,[.]

means for obtaining the absolute value of said instantaneous output $\Phi n$;
means for comparing said absolute value to a predetermined threshold value; and
means for counting the number of times said absolute value exceeds said threshold value during the time period $T$.

6. The image analyzer of claim 5 further comprising a pattern recognition device coupled to the output of said counter.